United States Patent
Wolf et al.

(10) Patent No.: US 8,531,074 B2
(45) Date of Patent: Sep. 10, 2013

(54) ELECTRIC MACHINE

(75) Inventors: Gert Wolf, Affalterbach (DE); Norbert Pfitzke, Sternenfels (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 12/513,613

(22) PCT Filed: Oct. 10, 2007

(86) PCT No.: PCT/EP2007/060767
§ 371 (c)(1), (2), (4) Date: Aug. 6, 2009

(87) PCT Pub. No.: WO2008/055752
PCT Pub. Date: May 15, 2008

(65) Prior Publication Data
US 2010/0066194 A1    Mar. 18, 2010

(30) Foreign Application Priority Data
Nov. 6, 2006 (DE) .......................... 10 2006 052 111

(51) Int. Cl.
H02K 3/28    (2006.01)

(52) U.S. Cl.
USPC .......................................... 310/179; 310/195

(58) Field of Classification Search
USPC ............ 310/195, 257, 263, 179, 180, 264
See application file for complete search history.

(56) References Cited

U.S. PATENT DOCUMENTS

| | | | | |
|---|---|---|---|---|
| 1,685,752 A | * | 9/1928 | Powell | 310/195 |
| 2,233,586 A | * | 3/1941 | Conrad | 320/137 |
| 4,751,448 A | * | 6/1988 | Auinger | 318/773 |
| 6,229,241 B1 | * | 5/2001 | Ishigami et al. | 310/208 |
| 7,705,506 B2 | * | 4/2010 | Koike et al. | 310/179 |
| 7,989,996 B2 | * | 8/2011 | Wolf et al. | 310/68 D |
| 2003/0057789 A1 | | 3/2003 | Buening et al. | |
| 2003/0107287 A1 | * | 6/2003 | Nishimura et al. | 310/180 |
| 2003/0132680 A1 | * | 7/2003 | Nakamura et al. | 310/180 |
| 2005/0006973 A1 | * | 1/2005 | Bradfield et al. | 310/180 |
| 2005/0093521 A1 | * | 5/2005 | Nishimura et al. | 322/32 |
| 2005/0248229 A1 | * | 11/2005 | Even et al. | 310/180 |
| 2007/0278872 A1 | | 12/2007 | Elser et al. | |

FOREIGN PATENT DOCUMENTS

| | | |
|---|---|---|
| CN | 101573853 | 11/2009 |
| DE | 33 45 272 | 7/1985 |
| DE | 103 61 859 | 8/2005 |
| EP | 1 296 439 | 3/2003 |
| WO | 0289306 | 4/2002 |
| WO | WO 2008/055752 | 5/2008 |

OTHER PUBLICATIONS

International Preliminary Report on Patentability, dated Jun. 10, 2009 for international application No. PCT/EP2007/060767.

* cited by examiner

Primary Examiner — Tran Nguyen
Assistant Examiner — Naishadh Desai
(74) Attorney, Agent, or Firm — Kenyon & Kenyon LLP

(57) ABSTRACT

An electric machine, in particular an electrically excited claw pole generator for a motor vehicle, is provided, having a stator winding, the phase terminals of which may be connected in the manner of a pentagram to a rectifier system. The stator winding has a five-phase design, phase terminals situated in adjacent slots being interconnected at least once. All of the phase terminals may be interconnected are situated in adjacent slots.

12 Claims, 8 Drawing Sheets

ELECTRIC MACHINE

FIELD OF THE INVENTION

The present invention is based on an electric machine, particularly an electrically excited claw pole generator for a motor vehicle.

BACKGROUND INFORMATION

German patent document DE 103 61 859 A1 discusses an electric machine in the form of an alternating current generator for motor vehicles. The winding ends in this instance are individually connected via interposed conductor elements to respectively one electric terminal of a connecting plate and to the terminals of a rectifier module, which necessitates a considerable expenditure of interconnection, especially in higher-phase machines.

SUMMARY OF THE INVENTION

The electric machine according to the exemplary embodiments and/or exemplary methods of the present invention having the features described herein has the advantage that the expenditure for the phase connections is kept low. This is true especially if all phase terminals to be interconnected are arranged in adjacent slots of the stator such that they may be interconnected directly and connected to the rectifier via a common connection. In this regard it has proved to be particularly advantageous if the respectively adjacent phase terminals are interconnected in the manner of a pentagram and if the stator has 5 slots per rotor pole. This results in a setup in which two additional interconnected phase terminals of adjacent slots follow at a distance of at most 5 slot divisions from the first two interconnected phase terminals.

Furthermore it is expedient if the phase terminals are situated in the region of 10 adjacent slots, the phase terminals of the $(2n-1)^{th}$ slot being respectively interconnected with the $2n^{th}$ slot, where n is an integer between 1 and 5. Such a concentrated arrangement of the phase terminals is especially suited for manufacturing the stator as a flat pack, which is rolled up into the finished circular stator after mounting the stator winding, since in this case there are only two overhangs of the winding at the joint between the two ends of the stator. This arrangement also results in advantages in terms of manufacturing technology since the terminals are relatively near each other, thus facilitating the welding process. On the other hand it may also be advantageous, however, when distributing the individual elements of the rectifier evenly over the circumference of the machine, also to distribute accordingly the positions of the phase terminals evenly over all slots because then the phase terminals are closely adjacent to the individual rectifier elements and only require short connections. In this case, there are respectively at least 4 slots without phase terminals between the interconnected phase terminals situated in adjacent slots.

The symmetry of the stator winding may be designed in a particularly advantageous manner if respectively an even number of conductors are interconnected in the phase terminals. The number of slots in the stator of the machine of the exemplary embodiments and/or exemplary methods of the present invention is expediently between 60 and 80, which for the 5-phase design of the stator winding results in a design of the rotor of the machine having 12, 14 or 16 claw pole fingers. These designs on the one hand provide sufficient power of the machine at low rotational speeds, but are still sufficiently mechanically stable even at the occurring maximum rotational speeds.

Exemplary embodiments of the present invention are shown in the drawing and are explained in greater detail in the following description.

DETAILED DESCRIPTION

Figure 1:
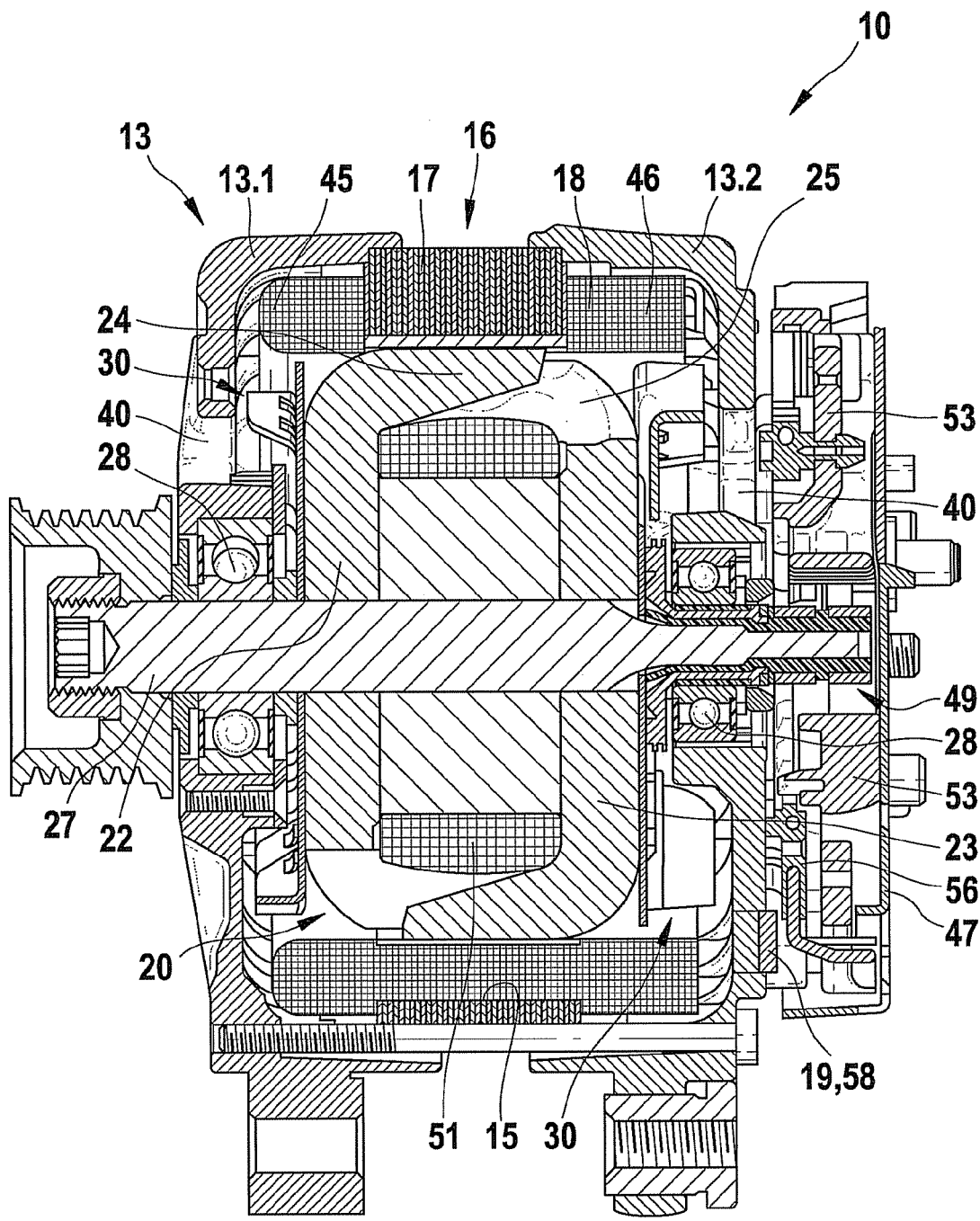
FIG. 1 shows a longitudinal section through an alternating current generator for motor vehicles having a claw pole rotor.

FIG. 1 shows a section through an alternating current generator 10 for motor vehicles. Among other things, it has a two-part housing 13, which is made up of a first end shield 13.1 and a second end shield 13.2. End shield 13.1 and end shield 13.2 accommodate a stator 16 between them, having an annular core stack 17, into whose inwardly open and axially extending groves 15 a stator winding 18 has been inserted. With its radially inward-facing surface, annular stator 16 surrounds an electromagnetically excited rotor 20, which is developed as a claw pole rotor. Rotor 20 is made up of, among other things, two claw pole plates 22 and 23, at the outer circumference of which claw pole fingers 24 and 25 are situated, extending in the axial direction. The two claw pole plates 22 and 23 are situated in rotor 20 in such a way that their axially extending claw pole fingers 24, 25 alternate with each other as N and S poles on the circumference of rotor 20. This creates magnetically required claw pole interstices between oppositely magnetized claw pole fingers 24 and 25, which run at a slight angle with respect to the machine axle due to claw pole fingers 24 and 25 tapering toward their free ends. For the following description of the exemplary embodiments and/or exemplary methods of the present invention, this path is described in simplified terms as axial.

Rotor 20 is rotatably supported in the respective end shields 13.1 and 13.2 by a shaft 27 and respectively one roller bearing 28 located on respectively one side. It has two axial end faces, on each of which a fan 30 is fastened. These fans 30 are essentially made up of a plate-shaped or disk-shaped section, from which fan blades proceed in a known manner. These fans 30 allow for an exchange of air between the outside and the interior of electric machine 10 via openings 40 in end shields 13.1 and 13.2. For this purpose, openings 40 are provided on the axial ends of end shields 13.1 and 13.2, via which fans 30 draw cooling air into the interior of electric machine 10. By the rotation of fans 30, this cooling air is accelerated radially outwards so as also to be able to pass through cooling air-permeable winding heads 45 on the drive side and 46 on the electronics side. This effect cools the winding heads. After passing through the winding heads, or rather, after flowing around these winding heads, the cooling air proceeds on a radially outward path through openings that are not shown.

In FIG. 1 on the right-hand side there is a protective cap 47 which protects various components from environmental influences.

This protective cap 47 covers, for instance, a slip ring module 49 which supplies excitation current to an excitation winding 51. A cooling body 53 is situated around this slip ring module 49, which in this case acts as a plus cooling body. End shield 13.2 acts as a so-called minus cooling body. A connecting plate 56 is situated between end shield 13.2 and cooling body 53, which connects negative diodes 58 fastened in end shield 13.2 and positive diodes (not shown in this illustration) of a rectifier 19 in cooling body 53 to each other in the form of a bridge circuit.

Figure 2:
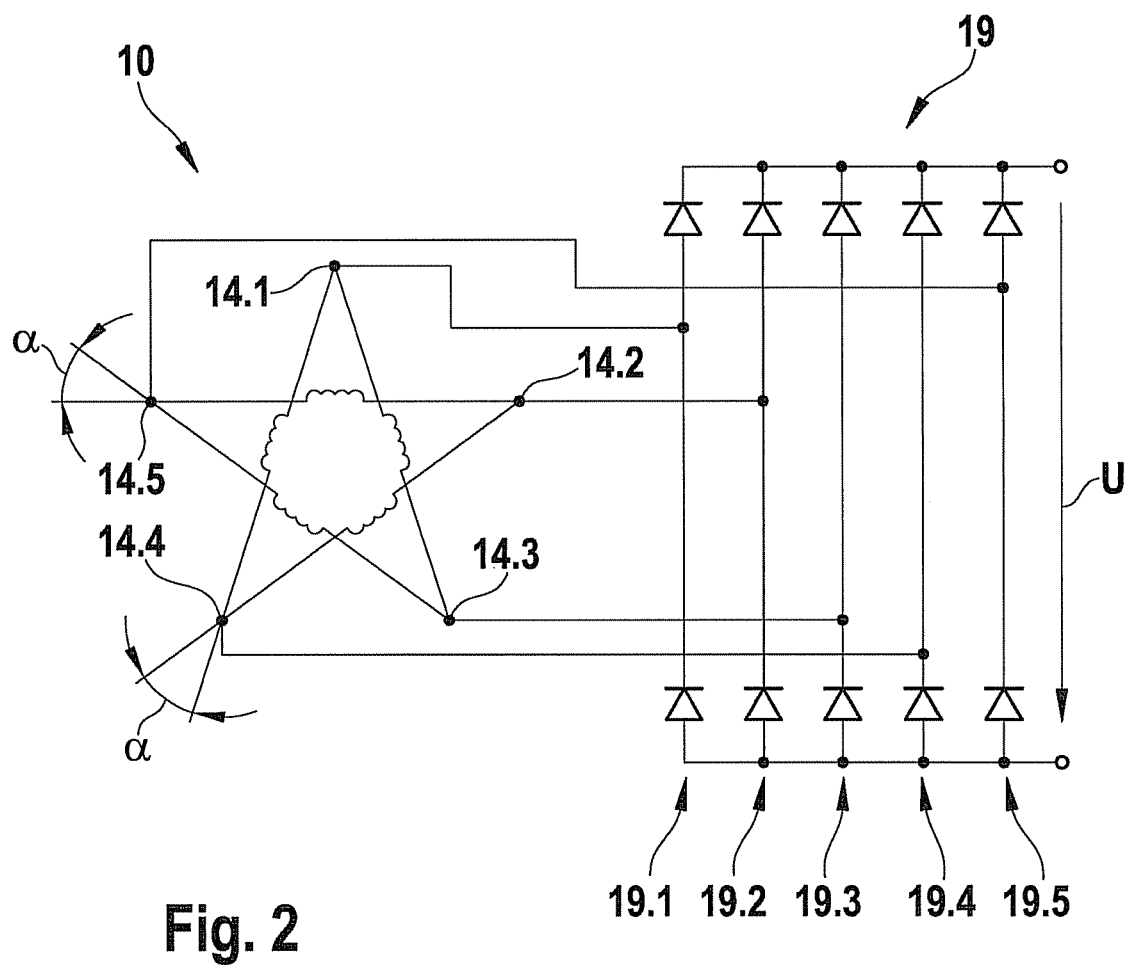
FIG. 2 shows a circuit diagram of a five-phase alternating current generator having a downstream rectifier.

FIG. 2 shows a five-phase generator 10 on the basis of a circuit diagram. The five winding phases respectively form in pairs the electrical angle αat connecting points 14.1-14.5 Generator 10 provides a voltage U on the output of a (B10) rectifier 19 having five bridge branches 19.1-19.5.

Interconnection points 14 are allocated to bridge branches 19 as follows: 14.1 to 19.1, 14.2 to 19.2, 14.3 to 19.3, 14.4 to 19.4 and 14.5 to 19.5. The electrical angle αbetween two winding phases at each connection point 14 is 36°.

FIGS. 3 through 6 show various winding patterns of a stator winding 18 having 30 slots, which corresponds to a design of rotor 20 having 6 claw pole fingers 24. In practice, for the generator of a motor vehicle, one normally chooses a higher number of slots and a higher number of claw pole fingers in rotor 20, which may be a number of 60-80 slots, which, at 5 slots per rotor pole, corresponds to a number of 12, 14 or 16 claw pole fingers 24. The five-phase stator winding 18 according to the exemplary embodiments and/or exemplary methods of the present invention may be interconnected in the form of a pentagram, as shown in, and already explained in more detail with reference to FIG. 2. The connection of the individual phases 14 then results in the form shown in FIGS. 3 through 6, all of the phase terminals 14.1-14.5 to be interconnected being situated in adjacent grooves. This is not strictly necessary, but interconnecting exclusively adjacent phases 14 yields the greatest possible rationalization.

Figure 3:
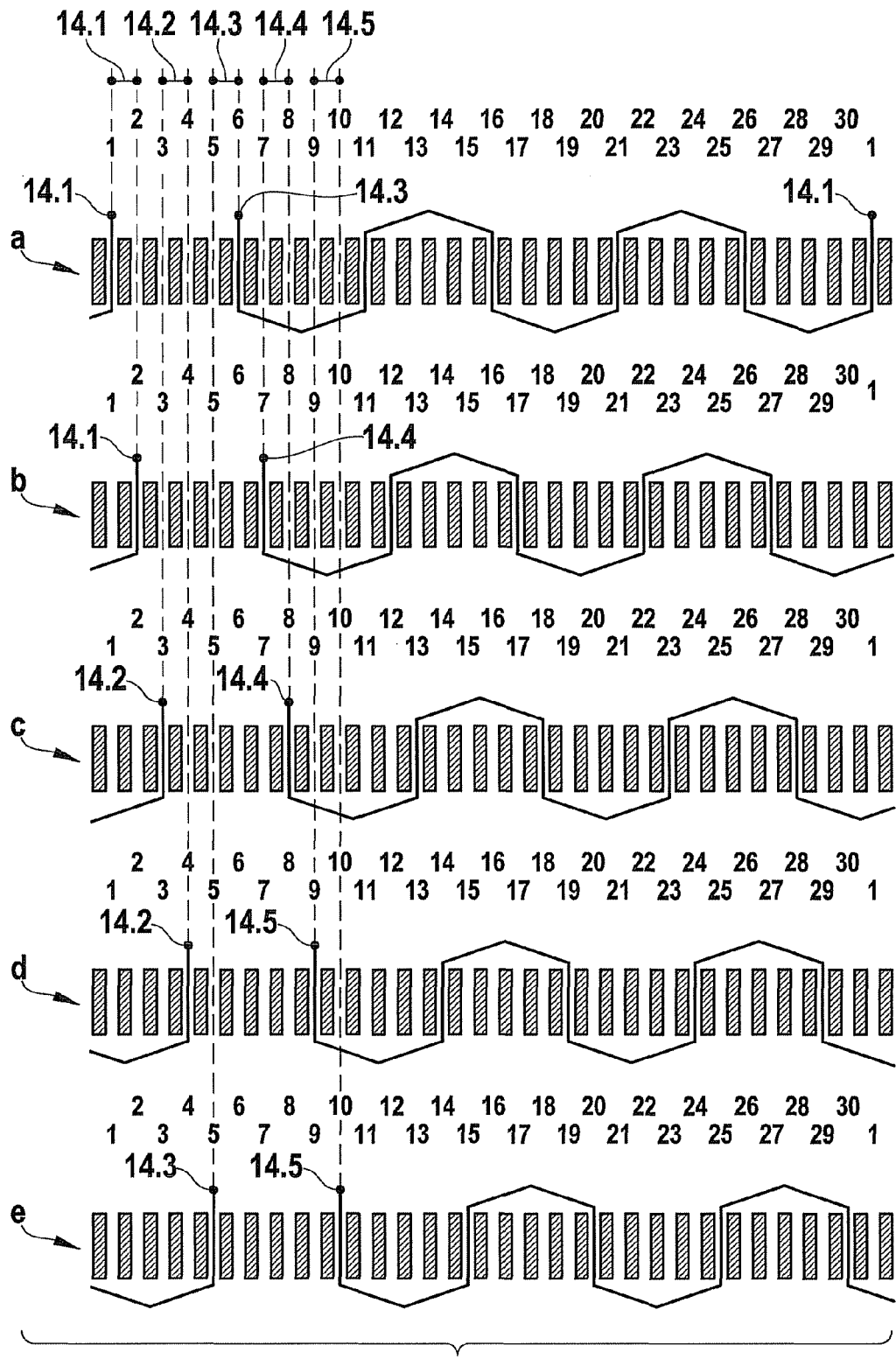
FIG. 3 shows a winding pattern of a five-phase stator winding in the form of a simple wave winding having terminals concentrated on the first 10 slots.

FIG. 3 shows the winding pattern of a stator winding 18 in the design as a simple wave winding having phase terminals 14.1-14.5 concentrated on the first 10 slots 15. In this instance, winding parts a through e are shown separately in FIG. 3 and the individual winding terminals are extended upward by dashed lines and are there brought together in accordance with the designations in FIG. 2. The stator winding is designed as a five-phase winding, which results in the best interconnection option. At the same time, this design of the winding keeps the generation of noise and the ripple of the produced generator voltage U low. The phase terminals to be interconnected all lie in adjacent slots and are interconnected in a particularly advantageous manner in the form of a pentagram, as was already shown and explained with reference to FIG. 2. Such an interconnection of the phase windings still results in a very good utilization of the machine, in particular lower reactive currents are produced than in a star or pentagon circuit.

In accordance with the five-phase design of stator winding 18, the number of stator slots 15 is respectively a multiple of 10, while the number of claw poles corresponds to a fifth of the number of slots. The winding patterns having 30 slots shown in FIGS. 3 through 6 thus necessitate 6 claw pole fingers 24 in rotor 20. This slot number, however, is chosen only for the purpose of a simplified representation of the winding since a rotor 20 having only 6 claw pole fingers reaches the required output power only starting at a relatively high rotational speed. In practice, the electric machines of a claw pole construction used as generators in motor vehicles have in particular 12 or 16 claw pole fingers 24 such that in the normal rotational speed range of motor vehicles between approximately 800 and 7000 rpm at a transmission ratio to the generator of 1:2.5-1:3 at rotational speeds of the electric machine starting at approximately 1800 rpm when idling, already a sufficient output power is achieved without the machine having to be mechanically overloaded at maximum rotational speeds of the driving internal combustion engine.

The winding pattern represented in FIG. 3 shows a simple wave winding having phase terminals 14.1-14.5 concentrated on the first 10 slots on the stator circumference. Such an arrangement of the phase terminals has in particular advantages in the case of a likewise concentrated arrangement of rectifiers 19 on connection plate 56 because this results in short connections to the rectifier terminals and a spatially compact arrangement of the welded connections. The interconnection of the individual conductors L of phases a through e is achieved as shown in FIG. 2 in such a way that in phase terminal 14.1 winding a is connected to winding b, in phase terminal 14.2 winding c is connected to winding d, in phase terminal 14.3 winding e is connected to winding a, in phase terminal 14.4 winding b is connected to winding c and in phase terminal 14.5 winding d is connected to winding e. Corresponding connections of windings a through e result in the winding pattern shown in FIG. 4, the winding being implemented as a distributed wave winding, however.

Figure 5:
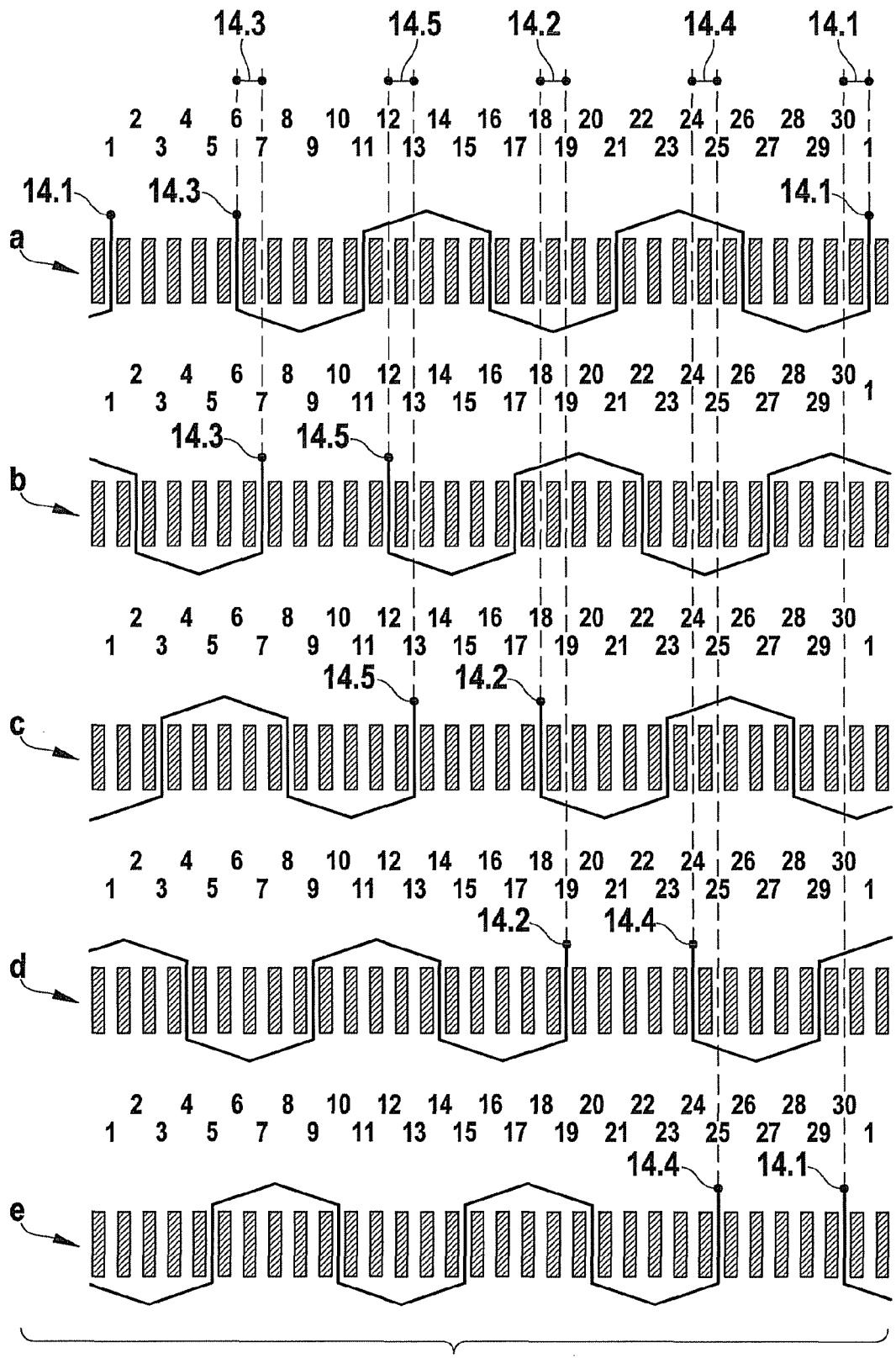
FIG. 5 shows a winding pattern of a five-phase stator winding in the form of a simple wave winding having terminals distributed over 30 slots.

FIG. 5 shows a winding pattern having phases a through e developed as a simple wave winding, phase terminals 14.1-14.5, however, being evenly distributed over all 30 slots. In this instance, in phase terminal 14.1 phase a is connected to phase e, in phase terminal 14.2 phase c is connected to phase d, in phase terminal 14.3 phase a is connected to phase b, in phase terminal 14.4 phase d is connected to phase e and in phase terminal 14.5 phase b is connected to phase c.

The uniform distribution of phase terminals 14.1-14.5 over the entire circumference of stator 16 offers advantages particularly when the diodes of rectifier 19 are also accordingly distributed uniformly on connection plate 56, which on the one hand results in favorable cooling conditions for the rectifiers and on the other hand in short and direct connections from the phase terminals to the rectifiers.

Figure 4:
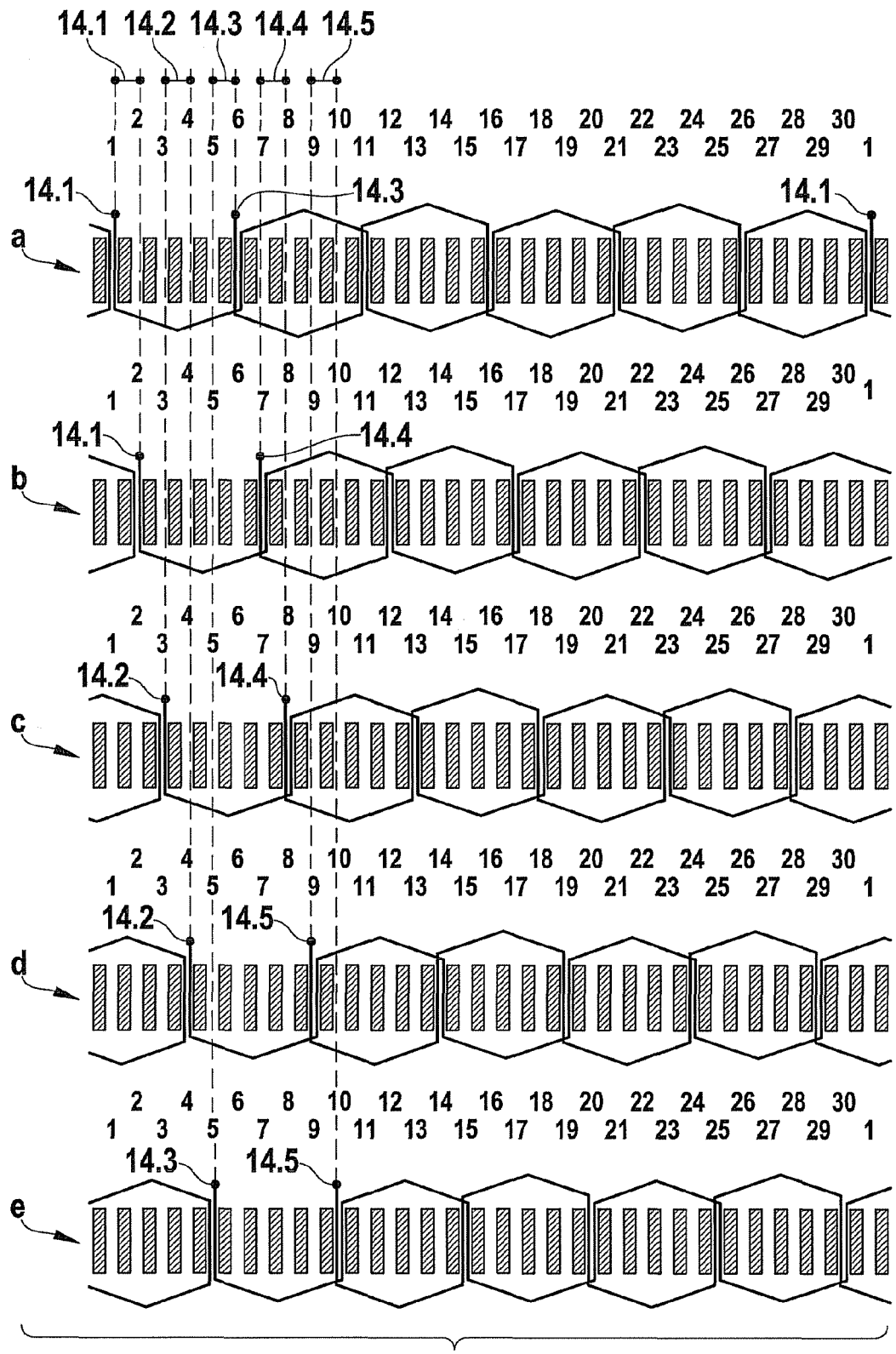
FIG. 4 shows a winding pattern of a five-phase stator winding in the form of a distributed wave winding having terminals concentrated on 10 slots.
Figure 6:
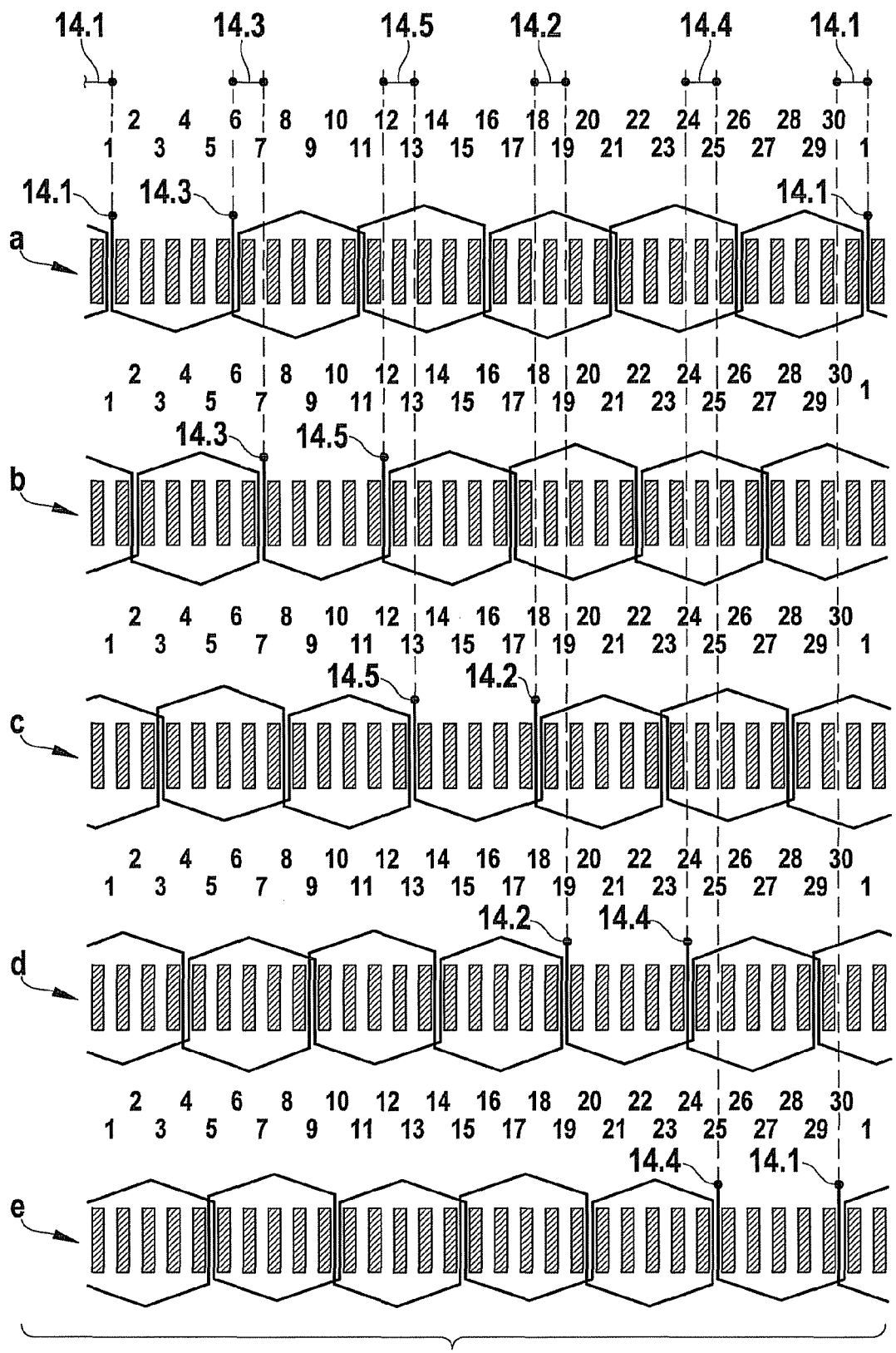
FIG. 6 shows a winding pattern of a five-phase stator winding in the form of a distributed wave winding having terminals distributed over 30 slots.

With respect to the distribution of phase terminals 14.1-14.5, the winding pattern shown in FIG. 6 corresponds to the winding pattern in FIG. 5, although in this instance stator winding 18 is again developed as a distributed wave winding in accordance with the pattern in FIG. 4. Compared to a lap winding that may in principle also be used, the wave winding shown in FIGS. 4 through 6 has shorter conductor lengths and thus a smaller electrical resistance for the same conductor cross section. Particularly when the electric machine is designed as a claw pole generator for motor vehicles, the wave winding additionally offers advantages in terms of manufacturing technology and it is easy to achieve a favorable design of the winding heads that is highly permeable to air and accordingly cools the winding well.

Figure 7:
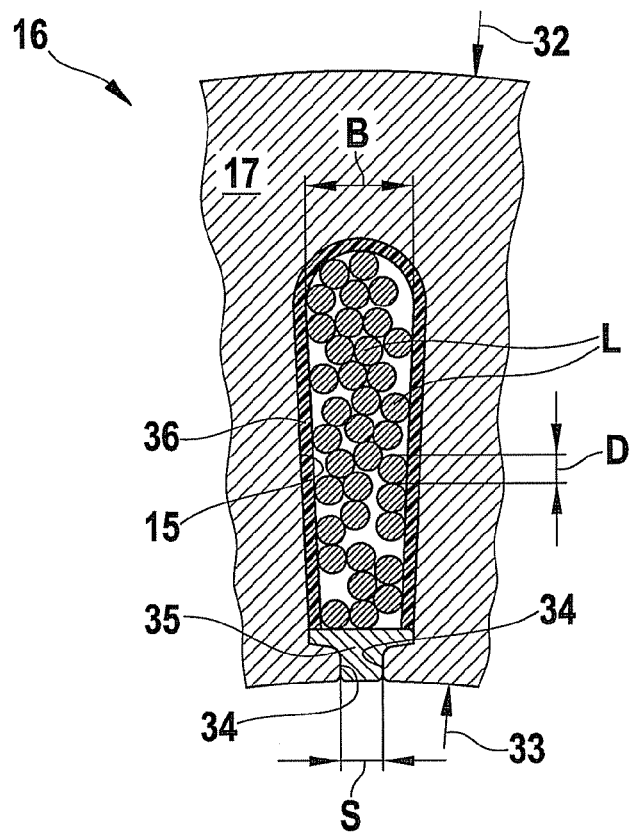
FIG. 7 shows a section through the stator of a machine of the present invention.

FIG. 7 shows in an enlarged view the design of a slot 15 in core stack 17 of stator 16. Here arrow 32 indicates the outer diameter of the stator and arrow 33 the inner diameter of the stator or the bore diameter for accommodating rotor 20. 34 indicates a slot opening, the slot width S of which is smaller than twice the conductor diameter D including the conductor insulation. Slot 15 is closed toward the stator's interior 33 by a slot closure 35. Additionally insulated by a slot insulation 36, conductors L are situated in slot 15. Here the greatest slot width B is greater than twice the conductor diameter D including the conductor insulation. The number of conductors L in a slot 15 is greater than 7, which yields favorable manufacturing conditions at a higher slot filling and sufficient cooling of the winding.

Figure 8:
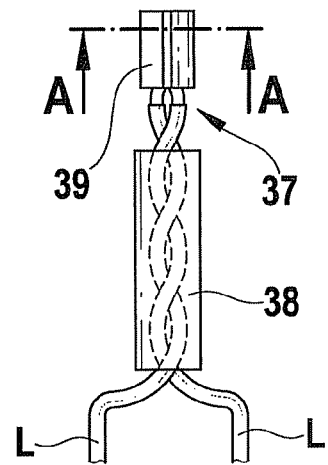
FIG. 8 shows a schematic representation of a phase terminal of the stator winding of the present invention.
Figure 8A:
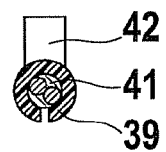
FIG. 8A shows another schematic representation of a phase terminal of the stator winding of the present invention.
Figure 8:
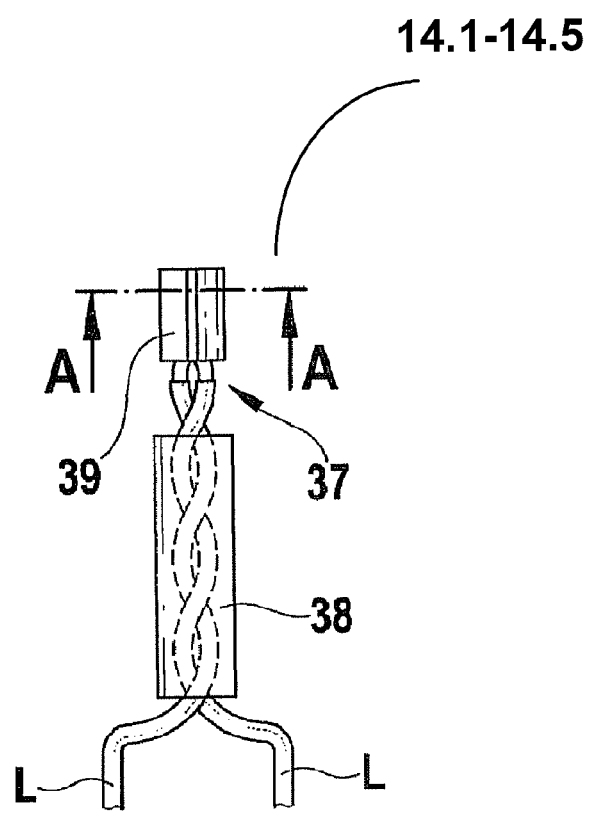

FIGS. 8 and 8A show the design of phase terminals 14.1-14.5 in detail for the embodiment having respectively one conductor L in adjacent slots. The conductor ends are twisted together and freed of insulation in region 37 outside of a bundling sleeve 38 and held together by a connecting clamp 39. Within clamp 39 in region 41, conductor ends 37 are soldered together and provided with a rectifier terminal 42, as shown in FIG. 8a. From rectifier terminal 42, respectively one connection runs to one of rectifier terminals 19.1 through 19.5 of rectifier 19, as shown in FIG. 2.

What is claimed is:

1. An electric machine, comprising:
   a rectifier system; and
   a stator winding having phase terminals which are connected to the rectifier system;
   wherein:
   the stator winding has a five-phase design;
   at least two of the phase terminals are situated in adjacent slots and interconnected to each other; and
   the winding phases of the stator winding are interconnected in the manner of a pentagram.

2. The electric machine of claim 1, wherein all of the phase terminals to be interconnected are situated in adjacent slots.

3. The electric machine of claim 1, further comprising:
   at least one rotor pole, wherein the stator has five slots for each of the at least one rotor pole.

4. The electric machine of claim 1, further comprising:
   12, 14 or 16 claw pole fingers, wherein the number of slots is 60 to 80.

5. The electric machine of claim 1, wherein at a distance of at most 5 slot divisions from the at least two interconnected phase terminals, two additional interconnected phase terminals of adjacent slots follow.

6. The electric machine of claim 1, wherein the phase terminals are situated in a region of 10 adjacent slots, the phase terminals of the $((2n)-1)^{th}$ slot being respectively interconnected with the $2n^{th}$ slot, where n is an integer between 1 and 5.

7. The electric machine of claim 1, wherein between two pairs of interconnected phase terminals whose respective interconnected phase terminals are situated in adjacent slots, there are at least 4 slots without phase terminals.

8. The electric machine of claim 1, wherein, for each of the phase terminals, a respective even number of conductors are interconnected.

9. The electric machine of claim 1, wherein a slot width is smaller than twice a conductor diameter including the conductor insulation.

10. The electric machine of claim 1, wherein a slot width is greater than twice a conductor diameter including the conductor insulation.

11. The electric machine of claim 1, wherein a number of conductors in a slot is greater than 7.

12. The electric machine of claim 1, wherein the electric machine is an electrically excited claw pole generator for a motor vehicle.

* * * * *

UNITED STATES PATENT AND TRADEMARK OFFICE
CERTIFICATE OF CORRECTION

PATENT NO.        : 8,531,074 B2                                          Page 1 of 1
APPLICATION NO.   : 12/513613
DATED             : September 10, 2013
INVENTOR(S)       : Wolf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Fifteenth Day of September, 2015

Michelle K. Lee
*Director of the United States Patent and Trademark Office*